United States Patent
Hidaka

(10) Patent No.: US 7,201,362 B2
(45) Date of Patent: Apr. 10, 2007

(54) HIGH TEMPERATURE RESISTANT SEAL STRUCTURE, VALVE COMPRISING THE SAME AND AEROSPACE CRAFT SIDE THRUSTER

(75) Inventor: Shozo Hidaka, Komaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/511,147

(22) PCT Filed: Apr. 16, 2003

(86) PCT No.: PCT/JP03/04818

§ 371 (c)(1),
(2), (4) Date: Jan. 5, 2006

(65) Prior Publication Data

US 2006/0157662 A1    Jul. 20, 2006

(30) Foreign Application Priority Data

Apr. 18, 2002    (JP) ............................. 2002-116399

(51) Int. Cl.
    *F16K 51/00*    (2006.01)
(52) U.S. Cl. ...................................... 251/214; 251/319
(58) Field of Classification Search ................ 251/214, 251/318–319; 123/188.9; 277/502
    See application file for complete search history.

(56) References Cited

U.S. PATENT DOCUMENTS

| | | | | |
|---|---|---|---|---|
| 4,353,388 A | * | 10/1982 | Isoyama et al. | 137/240 |
| 4,364,542 A | * | 12/1982 | Meyer | 251/214 |
| 4,394,872 A | * | 7/1983 | Schobl | 251/214 |
| 4,451,047 A | * | 5/1984 | Herd et al. | 251/214 |
| 4,570,942 A | * | 2/1986 | Diehl et al. | 251/214 |
| 4,886,241 A | * | 12/1989 | Davis et al. | 251/214 |
| 5,056,757 A | * | 10/1991 | Wood | 251/214 |
| 5,056,758 A | * | 10/1991 | Bramblet | 251/214 |
| 5,074,521 A | * | 12/1991 | Alexius et al. | 251/63.5 |
| 5,178,363 A | * | 1/1993 | Icenhower et al. | 251/214 |
| 5,238,252 A | * | 8/1993 | Stewen et al. | 251/214 |
| 5,316,319 A | * | 5/1994 | Suggs | 251/214 |
| 5,372,352 A | * | 12/1994 | Smith et al. | 251/214 |
| 5,503,367 A | * | 4/1996 | Thompson et al. | 251/214 |
| 6,129,336 A | * | 10/2000 | Sandling et al. | 251/214 |
| 6,227,247 B1 | * | 5/2001 | Abel | 137/625.62 |

FOREIGN PATENT DOCUMENTS

| JP | 51-127994 | 11/1976 |
|---|---|---|
| JP | 8-200513 | 8/1996 |
| JP | 2002-39014 | 2/2002 |

* cited by examiner

*Primary Examiner*—John Bastianelli
(74) *Attorney, Agent, or Firm*—Wenderoth, Lind & Ponack, L.L.P.

(57) ABSTRACT

A thruster valve for controlling a flow of high temperature fluid, comprising a valve casing, a graphite liner, a drive rod, and at least one relief hole. The graphite liner is disposed in a through hole within the valve casing. The drive rod being slidably received in drive rod through holes within the graphite liner, such that a seal is formed and maintained between the drive rod and the graphite liner. The drive rod is arranged so as to be driven in an axial direction by an actuator attached to an end of the drive rod arranged outside the valve casing. At least one of the relief holes is formed to extend through the graphite liner and valve casing to communicate the cavity with the exterior of the valve casing provide a drain passage. Thus, leakage of the high temperature fluid is prevented.

15 Claims, 2 Drawing Sheets

HIGH TEMPERATURE RESISTANT SEAL STRUCTURE, VALVE COMPRISING THE SAME AND AEROSPACE CRAFT SIDE THRUSTER

BACKGROUND OF THE INVENTION

1. Field of the Invention

The present invention relates to a high temperature resistant seal structure of an axial directional slide shaft of a valve, etc., handling a high temperature fluid in a side thruster of an aerospace craft, etc. The present invention also relates to a valve comprising this seal structure as well as relates to a side thruster of an aerospace craft comprising this valve.

2. Description of the Related Art

FIG. 2 is a longitudinal cross sectional view of a prior art side thruster valve used in an aerospace craft, etc. and description will be made based thereon.

As shown in FIG. 2, a thruster valve 01 comprises a valve casing 02. The valve casing 02 comprises a supply port 03 through which working medium a is supplied and a nozzle 04 from which the working medium a is discharged. Within the valve casing 02, the supply port 03 and a nozzle throat portion 05 of the nozzle 04 communicate with each other.

Also, within the valve casing 02, a valve plug 06 opening and closing the nozzle throat portion 05 is arranged being connected to one end of a drive rod 07. The drive rod 07 slidably passes through a drive rod through hole 09 of the valve casing 02 and the other end of the drive rod 07 projecting outside of the valve casing 02 is connected to an actuator 08 of a linear actuator, rotary actuator or the like so that the drive rod 07 is driven along the axial direction thereof as shown by a bidirectional arrow X. The actuator 08 is fixed to a fixing member (not shown).

The working medium a supplied through the supply port 03 flows through a space formed between the nozzle throat portion 05 and the valve plug 06 and is jetted from the nozzle 04 so that a thrust of the side thruster is generated. At this time, the actuator 08 drives the valve plug 06 so as to open and close the nozzle throat portion 05 and to change the area of the flow path of the working medium a. Thereby, the thrust can be changed continuously or step-wise.

In the drive rod through hole 09 of the valve casing 02, an elastomer seal 010 is provided so as to form a seal structure preventing the working medium a from leaking through between the valve casing 02 and the drive rod 07. It is to be noted that the term "elastometer" means a high molecular substance having a rubber elasticity.

Conventionally, in the slidable portion between the valve casing 02 and the drive rod 07 of the thruster valve 01 as mentioned above, such a metal seal as usually used for sealing between stationary faces cannot be used, as the sealing is not sufficiently achieved because of the sliding motion of the sealing face. Hence, the elastomer seal 010 of an O-ring or the like is used.

For this reason, if a high temperature fluid, such as combustion gas, is used as the working medium a, the elastomer seal 010 often melts because of the heat transmitted from the drive rod 07 so that the combustion gas leaks to form a leak gas b. Thus, the actuator 08 is exposed to the high temperature environment by the leak gas b and there is caused a risk of operation disorder of the actuator 08.

Also, if a structure to protect the elastomer seal 010 and the actuator 08 is to be employed, the valve casing 02 has to be made larger by that extent and there is a problem that this leads to a larger size and mass increase of the side thruster device.

Also, as the side thruster device uses the valve casing 02 made of a metal, the slide resistance between the valve casing 02 and the drive rod 07 becomes large under the high temperature in the drive rod through hole 09. Thus, the drive force of the thruster valve 01 is inevitably made larger and there is caused a problem that this again leads to a larger size of the actuator 08.

BRIEF SUMMARY OF THE INVENTION

Hence, in order to solve the problems in the high temperature resistant seal structure used in the prior art side thruster for an aerospace craft or the like, it is an object of the present invention to provide a high temperature resistant seal structure that does not have the problem of exposing the actuator to the high temperature environment, leading to an operation disorder. Moreover, another object of the present invention is to provide a valve that can reduce the valve drive force as well as provide a side thruster comprising this valve for use in an aerospace craft or the like.

In order to achieve the above-mentioned object, the present invention provides the following:

(1) In the first aspect of the present invention, wherein a high temperature resistant seal structure, provided in a casing into which a high temperature fluid is supplied, the present invention includes a shaft through hole portion into which a shaft to be driven in an axial direction of the shaft is inserted passing through the shaft hole portion, a liner, made of graphite, comprising a cavity formed therein and slidable holes provided at both end portions of the cavity are provided being inserted into the shaft through hole portion so that the shaft slidably passes through the slidable holes with a seal state being maintained between the shaft and the liner. Further, the present invention includes a relief hole which is bored in a lateral direction relative to the axial direction of the shaft so that the cavity and the outside of the casing communicate with each other.

According to the first aspect of the present invention constructed as mentioned above, even if the high temperature fluid leaks into the cavity through a minute gap between the shaft and the graphite-made liner, the high temperature fluid is discharged outside of the casing through the relief hole. Thereby, the high temperature fluid is prevented from leaking in the axial direction of the shaft and any slide resistance between the shaft and the graphite-made liner can also be reduced.

(2) A second aspect of the present invention includes a valve comprising the high temperature resistant seal structure of the first aspect, wherein the shaft is a drive rod of a valve plug of the valve, and an actuator, operable to drive the drive rod in the axial direction of the shaft, is connected to an end of the shaft (i.e. drive rod) which projects outside of the valve.

According to the second aspect of the present invention constructed as mentioned above, in the valve comprising the high temperature resistant seal structure of the first aspect, the actuator is prevented from being exposed to the high temperature environment. Thereby, in addition to the function and effect of the first aspect, the casing of the valve and the actuator can be made smaller.

(3) A third aspect of the invention includes an aerospace craft side thruster comprising the valve of the second aspect.

According to the third aspect of the present invention constructed as mentioned above, in the aerospace craft side thruster comprising the valve of the second aspect, even if a high temperature fluid of combustion gas, etc. is used as a working medium, the actuator of the thruster valve is prevented from being exposed to the high temperature environment caused by a leaking of the working medium. Thereby, an aerospace craft having a high reliability and reduced mass can be obtained.

DETAILED DESCRIPTION OF THE DRAWINGS

DETAILED DESCRIPTION OF THE INVENTION

Figure 1:
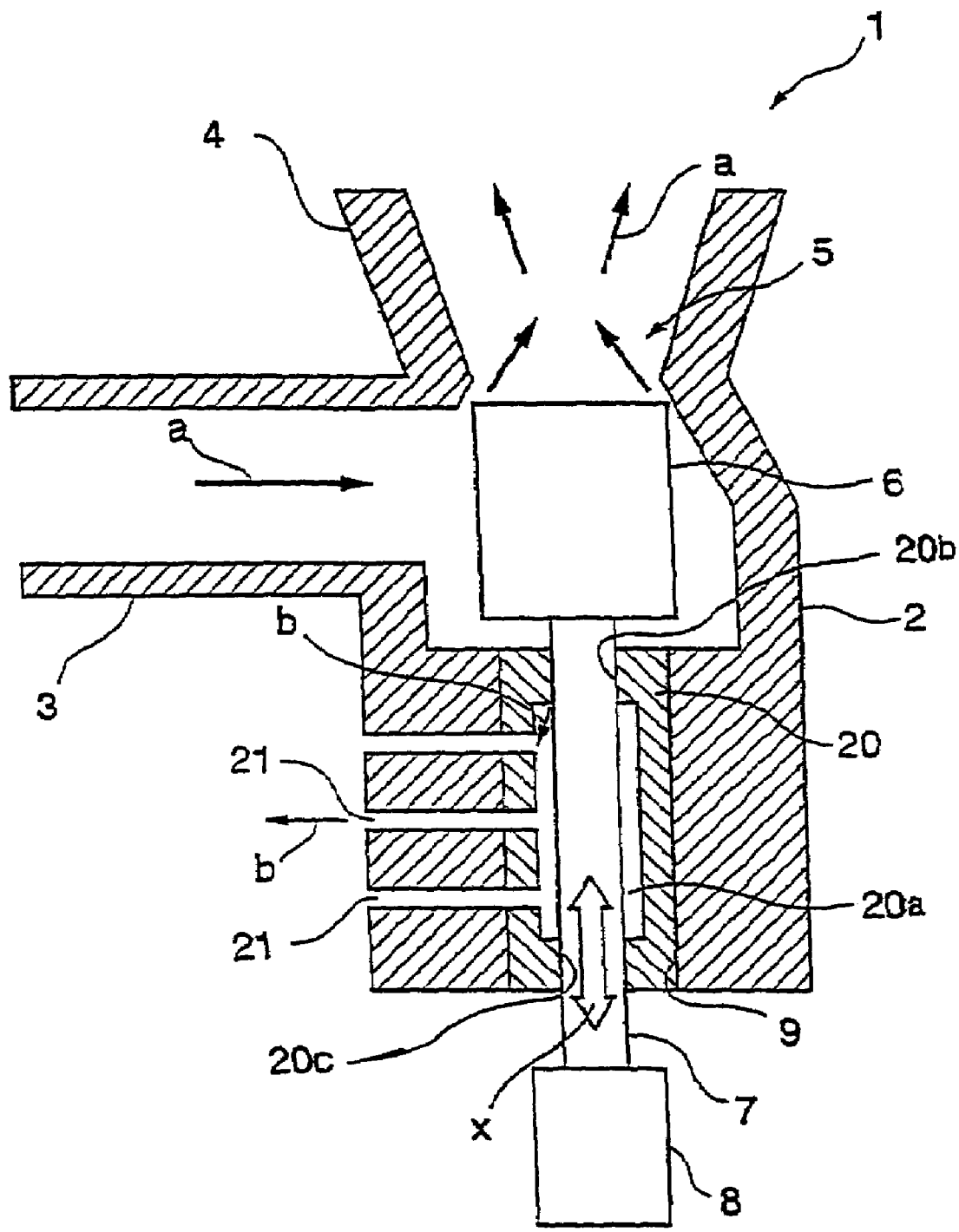
FIG. 1 is a longitudinal cross sectional view of a valve of an aerospace craft side thruster of an embodiment according to the present invention.

With reference to FIG. 1, a side thruster device for an aerospace craft or the like of one embodiment according to the present invention will be described. FIG. 1 is a longitudinal cross sectional view of a side thruster valve of the side thruster for an aerospace craft or the like of the present embodiment.

As shown in FIG. 1, a thruster valve 1 comprises a valve casing 2. The valve casing 2 comprises a supply port 3 through which working medium a of combustion gas or the like as a high temperature fluid is supplied and a nozzle 4 from which the working medium a is discharged. Within the valve casing 2, the supply port 3 and a nozzle throat portion 5 of the nozzle 4 communicate with each other.

Also, within the valve casing 2, a valve plug 6 for opening and closing the nozzle throat portion 5 is arranged being connected to one end of a drive rod 7. The drive rod 7 passes through a drive rod through hole 9 of the valve casing 2 and the other end of the drive rod 7 projecting outside of the valve casing 2 is connected to an actuator 8 of a linear actuator, rotary actuator or the like so that the drive rod 7 is driven along the axial direction thereof as shown by a bidirectional arrow X. The actuator 8 is fixed to a fixing member (not shown).

The working medium a supplied through the supply port 3 flows through a space formed between the nozzle throat portion 5 and the valve plug 6 and is jetted from the nozzle 4 so that a thrust of the side thruster is generated. At this time, the actuator 8 drives the valve plug 6 so as to open and close the nozzle throat portion 5 and to change the area of the flow path of the working medium a. Thereby, the thrust can be changed continuously or step-wise.

A graphite liner 20 is inserted into the drive rod hole 9 of the valve casing 2. The graphite liner 20 comprises a cavity 20a formed therein so that a space is formed between the drive rod 7 and the graphite liner 20. The graphite liner 20 comprises slidable holes 20b and 20c, wherein slidable holes 20b and 20c are arranged at both end portions of the cavity 20a so that the drive rod 7 slidably passes through both of the slidable holes 20b, 20c with a seal state being maintained between the drive rod 7 and the graphite liner 20.

A relief hole 21 is bored to extend from the cavity 20a in the direction substantially orthogonal to the axial direction of the drive rod 7 and passing through both the graphite liner 20 and the valve casing 2. Thus, when the drive rod 7 is assembled passing through the graphite liner 20, the cavity 20a formed around the drive rod 7 communicates with the outside of the thruster valve 1.

In the thruster valve 1 of an aerospace craft side thruster of the present embodiment as described above, the working medium a supplied through the supply port 3 is jetted from the nozzle 4 corresponding to the opening of the nozzle throat portion 5 set by the valve plug 6. At this time, a portion of the working medium a leaks as a leak gas b to flow into the cavity 20a through a minute gap between the drive rod 7 and the graphite liner 20 at the slidable hole 20b on the inner side of the thruster valve 1.

The leak gas b entering the cavity 20a is discharged outside of the thruster valve 1 through the relief hole 21 so that the leak gas b is substantially prevented from leaking in the axial direction of the drive rod 7 through the slidable hole 20c on the outer side of the thruster valve 1 or on the actuator 8 side.

Figure 2:
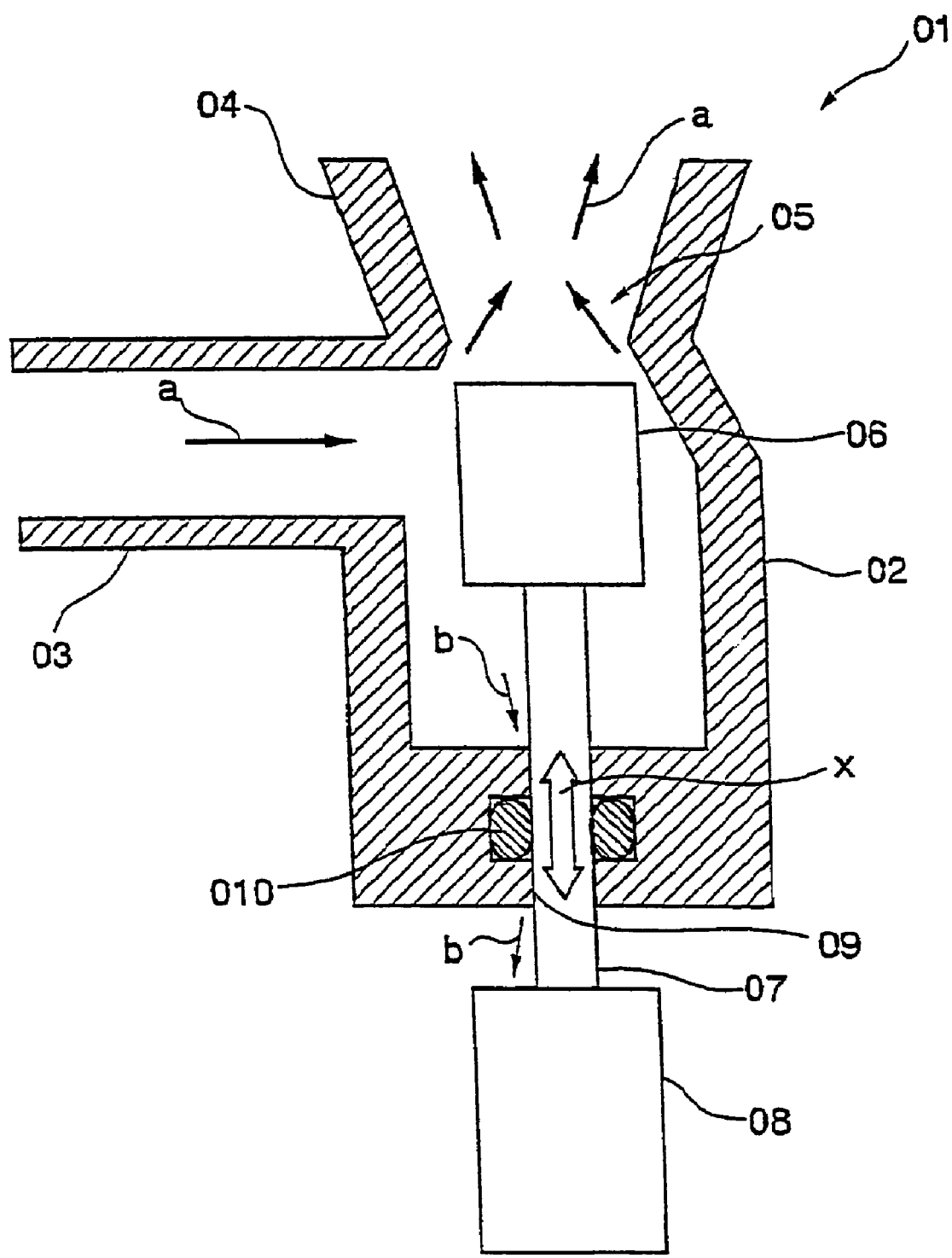
FIG. 2 is a longitudinal cross sectional view of a valve of a prior art aerospace craft side thruster.

Thereby, the actuator 8 can be prevented from being exposed to the leak gas b of the high temperature working medium a of the combustion gas or the like and the problem to cause the operation disorder can be solved. Referring to the prior art, the valve casing that has so far been made in a large size for protecting the elastomer seal 010 (FIG. 2) and the actuator 08 (FIG. 2) from the leak gas b can be made smaller in size and lighter in weight.

Moreover, as the graphite has a very high heat resistant temperature and a small friction resistance even at high temperature, the graphite can withstand the high temperature of the working medium a and the leak gas b. Also, the slide resistance between the drive rod 7 and the graphite liner 20 can be reduced. Thereby, the actuator 8 also can be made smaller in size.

The seal structure of the thruster valve 1 as described above can be generally effectively applied as a high temperature resistant seal structure of an axial directional slide shaft of a valve, etc. handling a high temperature fluid. By so applying the present seal structure, a leakage of the high temperature fluid along the slide shaft can be prevented and an operation disorder of the surrounding parts and components in the high temperature environment caused thereby can be prevented and an axial directional drive force of the slide shaft can be reduced by the reduced slide resistance. Thus, an effect that the actuator, etc. can be made smaller and lighter is obtained.

If the axial directional slide shaft is a drive rod of a valve plug, by the valve having the above-mentioned high temperature resistant seal structure, an effect to prevent the problem that the actuator is exposed to the high temperature environment to lead to an operation disorder can be obtained, in addition to the above-mentioned effect of making the valve casing and the actuator smaller, etc. Thereby, a reliability of the valve can be enhanced.

Also, in an aerospace craft side thruster using the thruster valve having the above-mentioned high temperature resistant seal structure, the leakage of the high temperature fluid of combustion gas, etc. as the working medium is prevented. Accordingly, the operation disorder of the actuator due to the high temperature environment is prevented and the thruster valve and the actuator can be made smaller so that the entire side thruster device can be made smaller. Thereby, an aerospace craft side thruster having a high reliability and reduced mass can be obtained.

In the above, while the embodiment according to the present invention has been described, the present invention is not limited thereto but various modifications thereof can be added to the concrete structure within the scope of the invention as recited in the claims.

For example, while the illustration of the relief hole 21 has been shown such that there are provided three relief holes 21 bored in one side portion of the drive rod 7, the number of the relief holes 21 may be one or a plurality. Also, the relief holes 21 may be bored in an arbitrary side portion (including an entire periphery) of the drive rod 7 according to the discharge condition of the leak gas b and the arrangement of the surrounding parts and components.

Also, while the relief hole 21 has been illustrated to extend linearly in the direction orthogonal to the drive rod 7, if the elongating direction in which the relief hole extends is lateral as a whole relative to the axial direction of the drive rod 7, the relief hole 21 may be inclined or bent. Moreover, the relief hole 21 may be connected with a gas discharge pipe (not shown).

What is claimed is:

1. A thruster valve for controlling a flow of a high temperature fluid, said thruster valve comprising:
    a valve casing having a fluid flow passage in which a valve plug is disposed, and a through hole;
    a graphite liner arranged in said through hole, said graphite liner having a cavity and drive rod through holes;
    a drive rod slidably received in said drive rod through holes of said graphite liner such that a seal is formed and maintained between said drive rod and said graphite liner, said drive rod having an interior end arranged inside said valve casing and an exterior end arranged outside said valve casing, wherein said drive rod is arranged so as to be driven in an axial direction by an actuator attached to the exterior end of said drive rod, and wherein the interior end of said drive rod is attached to the valve plug; and
    at least one relief hole formed so as to extend through said graphite liner and said valve casing in a direction transverse to the axial direction of said drive rod so as to communicate said cavity of said graphite liner with the exterior of said valve casing, such that any high temperature fluid leaked from said fluid flow passage into said cavity of said graphite liner is provided a drain passage from said cavity to the exterior of said valve casing.

2. The thruster valve according to claim 1, wherein said thruster valve is an aerospace craft-side thruster.

3. The thruster valve according to claim 1, wherein said at least one relief hole comprises a plurality of relief holes extending in a direction transverse to the axial direction of said drive rod so as to communicate said cavity of said graphite liner with the exterior of said valve casing.

4. The thruster valve according to claim 1, wherein said fluid flow passage further comprises a fluid inlet and a fluid outlet.

5. The thruster valve according to claim 4, wherein
    the interior end of said drive rod is arranged to adjust a position of the valve plug when said drive rod is driven in the axial direction, and
    the valve plug is arranged so as to control the flow of the high temperature fluid exiting said fluid outlet according to the position of the valve plug.

6. A thruster valve for controlling a flow of a high temperature fluid, said thruster valve comprising:
    a valve casing having a through hole;
    a graphite liner arranged in said through hole, said graphite liner having a cavity and drive rod through holes;
    a drive rod slidably received in said drive rod through holes of said graphite liner such that a seal is formed and maintained between said drive rod and said graphite liner, said drive rod having an interior end arranged inside said valve casing and an exterior end arranged outside said valve casing, wherein said drive rod is arranged so as to be driven in an axial direction; and
    at least one relief hole formed so as to extend through said graphite liner and said valve casing in a direction transverse to the axial direction of said drive rod so as to communicate said cavity of said graphite liner with the exterior of said valve casing, such that any high temperature fluid leaked into said cavity of said graphite liner is provided a drain passage from said cavity to the exterior of said valve casing.

7. The thruster valve according to claim 6, wherein said thruster valve is an aerospace craft-side thruster.

8. The thruster valve according to claim 6, wherein said at least one relief hole comprises a plurality of relief holes extending in a direction transverse to the axial direction of said drive rod so as to communicate said cavity of said graphite liner with the exterior of said valve casing.

9. The thruster valve according to claim 6, wherein said fluid flow passage further comprises a fluid inlet and a fluid outlet.

10. The thruster valve according to claim 9, wherein
    a valve plug is disposed in a fluid flow passage arranged in said valve casing and is arranged to control the flow of the high temperature fluid according to a position of said valve plug, and
    the interior end of said drive rod is arranged to adjust the position of said valve plug when said drive rod is driven in the axial direction.

11. A thruster valve for controlling a flow of a high temperature fluid, said thruster valve comprising:
    a valve casing having a fluid flow passage in which a valve plug is disposed, and a through hole;
    a high temperature seal structure having
        a graphite liner arranged in said through hole, said graphite liner having a cavity and drive rod through holes, and
        a drive rod slidably received in said drive rod through holes of said graphite liner such that a seal is formed and maintained between said drive rod and said graphite liner, said drive rod having an interior end arranged inside said valve casing and an exterior end arranged outside said valve casing, wherein said drive rod is arranged so as to be driven in an axial direction by an actuator attached to the exterior end of said drive rod, and wherein the interior end of said drive rod is attached to the valve plug; and
    at least one relief hole formed so as to extend through said graphite liner and said valve casing in a direction transverse to the axial direction of said drive rod so as to communicate said cavity of said graphite liner with the exterior of said valve casing, such that any high temperature fluid leaked from said fluid flow passage into said cavity of said graphite liner is provided a drain passage from said cavity to the exterior of said valve casing.

12. The thruster valve according to claim 11, wherein said thruster valve is an aerospace craft-side thruster.

13. The thruster valve according to claim 11, wherein said at least one relief hole comprises a plurality of relief holes extending in a direction transverse to the axial direction of said drive rod so as to communicate said cavity of said graphite liner with the exterior of said valve casing.

14. The thruster valve according to claim 11, wherein said fluid flow passage further comprises a fluid inlet and a fluid outlet.

15. The thruster valve according to claim 14, wherein
- the interior end of said drive rod is arranged to adjust a position of the valve plug when said drive rod is driven in the axial direction, and
- the valve plug is arranged so as to control the flow of the high temperature fluid exiting said fluid outlet according to the position of the valve plug.

* * * * *